Jan. 21, 1947.　　　O. A. WINDSOR　　　2,414,575
JUNCTION BOX
Filed Jan. 10, 1944
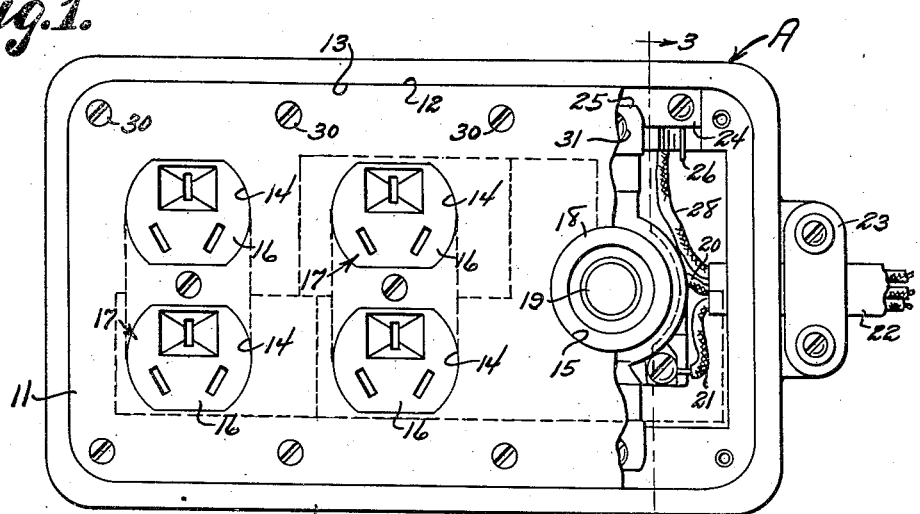
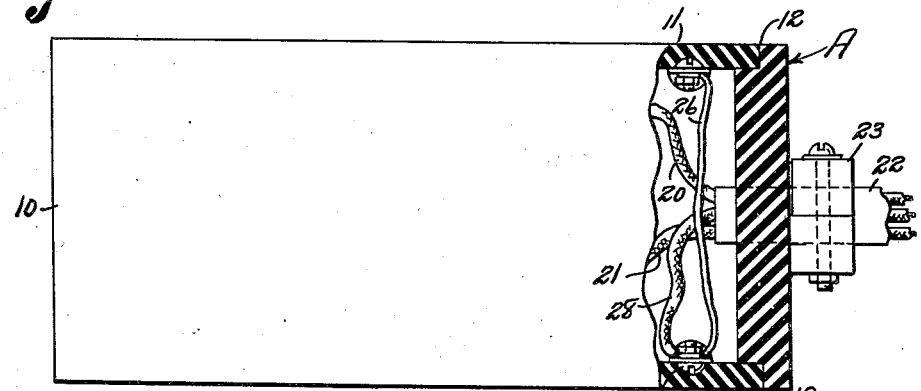
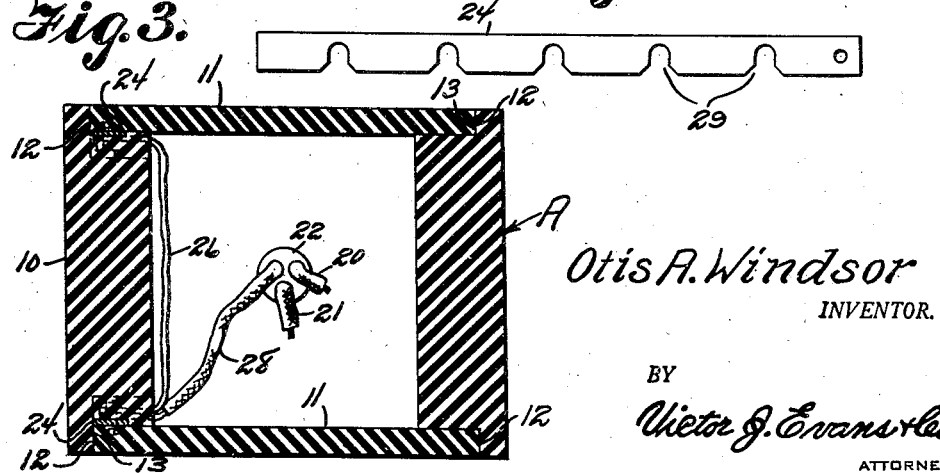
Otis A. Windsor
INVENTOR.
BY
Victor J. Evans & Co.
ATTORNEYS Patented Jan. 21, 1947

2,414,575

UNITED STATES PATENT OFFICE 2,414,575

JUNCTION BOX

Otis A. Windsor, Santa Monica, Calif.

Application January 10, 1944, Serial No. 517,707

4 Claims. (Cl. 173—334)

The invention relates to an electrical outlet unit, and more especially to a fused outlet box for electrical appliances. The primary object of the invention is the provision of a box of this character, wherein its body is formed from insulating material and is constructed to confine therein a fuse receptacle and a plurality of outlet receptacles, the ground connection of these being novel and unique, the said box being readily transported to any convenient location, and the fuse intended to blow first, thereby protecting the main fuse in a power line in the event of a short circuit in an appliance connected to the junction unit or box.

Another object of the invention is the provision of a unit or box of this character, wherein the ground band is interfitted with the unit or box where a removable cover or face plate attaches, thereby employing the same fasteners for so doing, and with a concealment of such band.

A further object of the invention is the provision of a box or unit of this character, wherein a shoulder portion at one side of the same is recessed at the top and bottom to receive the bus bars which form the ground connections for all the outlet receptacles and for the fuse receptacle, the bus bars being connected together by a wire and are grounded through an insulated lead extending outwardly of the unit or box, this wire with the current wires being encased as a single cable set-up.

A still further object of the invention is the provision of a unit or box of this character, which is simple in construction, thoroughly reliable and efficient in the purposes intended thereof strong, durable, readily and easily assembled, permitting the increasing or decreasing of the outlet capacity thereof, and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing:

Figure 1 is a plan view of the box or unit constructed in accordance with the invention and partly broken away to show adjuncts thereof.

Figure 2 is a similar view looking toward one side of the same.

Figure 3 is a sectional view taken on the line 3—3 of Figure 1 looking in the direction of the arrows.

Figure 4 is a plan view of one bus bar or ground band.

Similar reference characters indicate corresponding parts throughout the several views in the drawing.

Referring to the drawing in detail, A designates generally the outlet unit or box constructed in accordance with the invention as hereinafter set forth.

The unit or box A comprises a substantially rectangular shaped body 10 made from insulating material, preferably hard rubber or a composition containing the same, having at opposite sides thereof removable cover or face plates 11, which are counter-seated at 12 to lie flush with marginal shoulders 13 about the edges next thereto of the body 10. Each plate 11 is provided with openings 14 and 15, respectively, the former conforming to the socket heads 16 of current outlet receptacles 17, which in this instance are of the twin type, while the opening 15 gives access to a fuse receptacle 18 in which fits a fusible plug 19, as is usual.

The receptacles 17 and 18 are electrically connected with current wires 20 and 21, respectively, encased in a three wire cable 22 which extends without the body 10, and engaged by a clamp device 23 associated therewith at one end of said body, the wires 20 and 21 being in connection with an electric power source not shown.

Countersunk in the seats 12 are bus bars or ground bands 24, which have the saddle pieces 25 of the receptacles 17 functioning as ground terminals thereto, connected with the said bus bars or ground bands 24, the latter being joined in a pair at opposite sides of the unit or box A by a bridge wire 26 through a binding post 27, to which is connected the ground wire 28, the third wire of the cable 22. Each bus bar or band 24 is recessed as at 29 to clear the screws 30 for fastening the plates 11 in place, and these plates hold the bus bars or bands counter-seated as will be apparent from Figure 3 of the drawing.

Each saddle piece 25 is fixed to the body 10 at the recessed area 29 of the bus bars or bands 24, in bridging relation thereto and in contact therewith, by suitable fasteners 31.

Although the drawing, and the foregoing description discloses the preferred embodiment of the invention, it is to be understood that the said invention is to be in no way limited in the details of such disclosure, for in a practical application of the device many changes in the forms and proportions may be made as circumstances require or experience suggests without departing from the

What is claimed is:

1. A ground for an electrical outlet unit comprising a plurality of oppositely positioned bus bars, a bridge wire connecting said bus bars, a ground wire connected to one of said bus bars and saddle pieces for the outlets of said unit forming ground connections therefrom with the bus bars.

2. The invention as described in claim 1 wherein means is provided for holding said bus bars in said outlet unit.

3. The invention as described in claim 1 wherein said bus bars are recessed for clearing the means for holding said bars in said outlet.

4. The invention as described in claim 1 wherein means are provided for holding the saddle pieces fixed with relation to the bus bars and in contact therewith.

OTIS A. WINDSOR.